(12) United States Patent
Bruck et al.

(10) Patent No.: US 10,150,184 B2
(45) Date of Patent: Dec. 11, 2018

(54) METHOD OF FORMING A CLADDING LAYER HAVING AN INTEGRAL CHANNEL

(71) Applicant: Siemens Energy, Inc., Orlando, FL (US)

(72) Inventors: Gerald J. Bruck, Titusville, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 436 days.

(21) Appl. No.: 14/918,792

(22) Filed: Oct. 21, 2015

(65) Prior Publication Data

US 2017/0113302 A1 Apr. 27, 2017

(51) Int. Cl.

| | |
|---|---|
| *B23K 26/342* | (2014.01) |
| *B33Y 10/00* | (2015.01) |
| *B22F 1/00* | (2006.01) |
| *B23K 26/00* | (2014.01) |
| *B22F 3/105* | (2006.01) |
| *B22F 5/10* | (2006.01) |
| *C04B 41/51* | (2006.01) |
| *C22C 1/10* | (2006.01) |
| *B33Y 80/00* | (2015.01) |
| *B23K 26/70* | (2014.01) |

(Continued)

(52) U.S. Cl.
CPC .......... *B23K 26/342* (2015.10); *B22F 1/0003* (2013.01); *B22F 3/1055* (2013.01); *B22F 5/10* (2013.01); *B23K 26/0006* (2013.01); *B23K 26/70* (2015.10); *B33Y 10/00* (2014.12); *B33Y 80/00* (2014.12); *C04B 41/51* (2013.01); *C22C 1/1015* (2013.01); *B22F 2005/103* (2013.01);
*B22F 2999/00* (2013.01); *B23K 2103/08* (2018.08); *B23K 2103/26* (2018.08)

(58) Field of Classification Search
CPC .. B23K 26/00; B23K 26/0006; B23K 26/342; B23K 2203/08; B22F 1/0003; B22F 1/00; B22F 3/10; B29C 41/08; B29C 43/006; B29C 2043/3427
USPC ...................................................... 219/76.12
See application file for complete search history.

(56) References Cited

U.S. PATENT DOCUMENTS

| | | |
|---|---|---|
| 6,355,086 B2 | 3/2002 | Brown et al. |
| 6,410,105 B1 | 6/2002 | Mazumder et al. |

(Continued)

FOREIGN PATENT DOCUMENTS

| | | |
|---|---|---|
| CA | 2496382 A1 | 3/2004 |
| CN | 1334158 A | 2/2002 |

(Continued)

OTHER PUBLICATIONS

Kumada, M., Heat Transfer Enhancement of Heat Exchangers, 1999, Kluwer Academic Publishers, Abstract.

(Continued)

*Primary Examiner* — Brian Jennison

(57) ABSTRACT

A method including: submerging a ceramic preform (10) in a layer (12) of powdered superalloy material (14), wherein the preform defines a desired shape of a channel (60, 62, 64, 78) to be formed in a layer (42) of superalloy material; melting the powdered superalloy material around the preform without melting the preform; and cooling and re-solidifying the superalloy material around the preform to form the layer of superalloy material with the preform defining the shape of the channel therein.

13 Claims, 3 Drawing Sheets

(51) Int. Cl.
*B23K 103/08* (2006.01)
*B23K 103/18* (2006.01)

(56) References Cited

U.S. PATENT DOCUMENTS

| | | | |
|---|---|---|---|
| 6,472,029 | B1 | 10/2002 | Skszek |
| 6,528,123 | B1 | 3/2003 | Cadden et al. |
| 6,921,014 | B2 * | 7/2005 | Hasz ................. C23C 26/02 228/122.1 |
| 6,937,921 | B1 | 8/2005 | Mazumder |
| 7,241,415 | B2 | 7/2007 | Khoshnevis |
| 7,478,742 | B2 | 1/2009 | Beyer et al. |
| 8,021,742 | B2 | 9/2011 | Anoshkina et al. |
| 8,357,454 | B2 | 1/2013 | Kulkarni et al. |
| 9,061,943 | B2 | 6/2015 | Ning et al. |
| 2011/0106290 | A1 * | 5/2011 | Hovel ................. B22F 3/1055 700/120 |
| 2011/0189440 | A1 * | 8/2011 | Appleby ................. B22C 9/04 428/156 |
| 2012/0156054 | A1 | 6/2012 | Lacy et al. |
| 2013/0140278 | A1 | 6/2013 | Bruck et al. |
| 2013/0168902 | A1 * | 7/2013 | Herzog ................. B22F 3/1055 264/401 |
| 2014/0248512 | A1 | 9/2014 | Kamel et al. |
| 2015/0147479 | A1 | 5/2015 | Bunker et al. |

FOREIGN PATENT DOCUMENTS

| | | |
|---|---|---|
| CN | 101538171 A | 9/2009 |
| CN | 102078962 A | 6/2011 |
| CN | 103288494 A | 9/2013 |
| CN | 103878374 A | 6/2014 |
| JP | 2005197600 A | 7/2005 |

OTHER PUBLICATIONS

Bi Jianqiang et al, "Special Ceramics Process and Properties"; Harbin Institute of Technology Press, Mar. 31, 2008, pp. 102-106.

\* cited by examiner

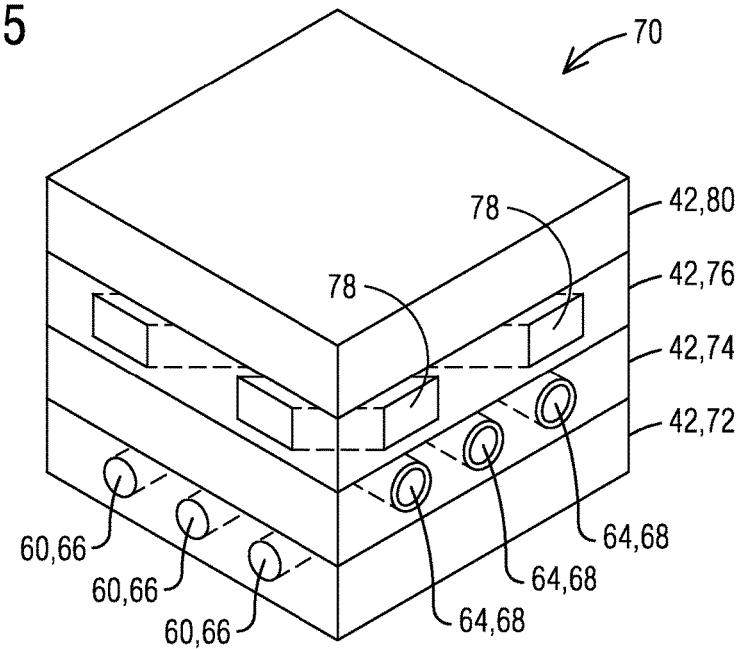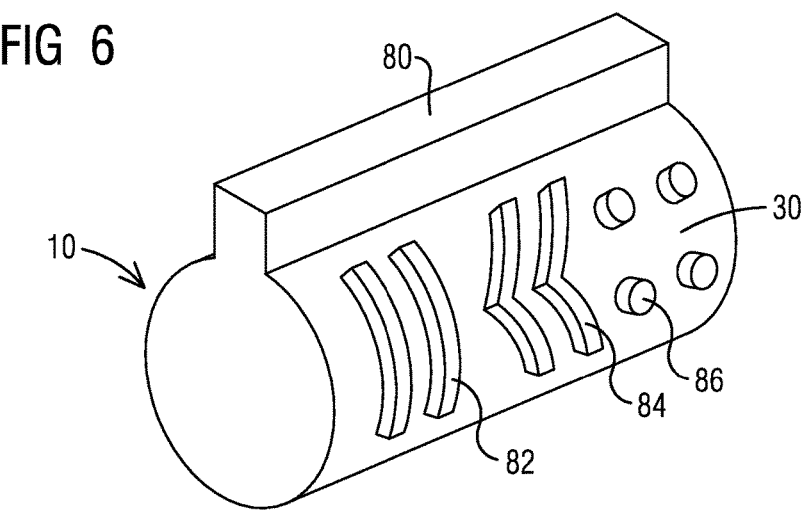

METHOD OF FORMING A CLADDING LAYER HAVING AN INTEGRAL CHANNEL

FIELD OF THE INVENTION

The invention relates generally to additive manufacturing, and more specifically to forming a material layer having an internal void or channel of fine detail, and in one embodiment to forming a superalloy cladding layer containing a precision detailed cooling channel using a high deposition rate cladding operation.

BACKGROUND OF THE INVENTION

Additive manufacturing is generally considered the buildup of three dimensional components by multiple layer processing, each layer representing a portion of the three dimensional component. The three dimensional component may be produced using energy sources of high enough power to melt a powdered metal or a powdered alloy used in the three dimensional component. For example, high power laser beams are commonly used in a manner where the laser sinters or fuses the powdered metal or powdered alloy layer by layer. These processes include selective laser sintering (SLS), selective laser melting (SLM), direct metal laser sintering (DMLS), laser engineered net shape (LENS), etc. The processes build up the component after many minute layers are processed. However, these processes have disadvantages and limitations. For example, some of the processes are exceedingly slow and cost prohibitive if many parts are required, or if a part is relatively large.

High deposition laser cladding such as that described in U.S. patent publication number 2013/0140278 to Bruck et al. and incorporated in its entirety by reference herein resolves the issue of speed. However, many gas turbine engine components used to guide hot gases require cooling channels disposed in the part near the surface. These cooling passages include fine detail that has not yet been achieved using the processes noted above. Consequently, there remains room in the art for improvement.

BRIEF DESCRIPTION OF THE DRAWINGS

The invention is explained in the following description in view of the drawings that show:

FIG. 5 schematically depicts a component having cooling passages formed by repeating the process illustrated in FIGS. 1-3.

FIG. 6 schematically depicts a preform having structural surface detail.

DETAILED DESCRIPTION OF THE INVENTION

The inventors propose using a preform having fine detail and which doesn't melt during a high deposition rate cladding process to create finely detailed channels (a.k.a. voids) within a superalloy cladding layer. The channels may be used for cooling, diagnostic, or other purposes, depending on the application. An exemplary embodiment of cooling channels is chosen for discussion herein. However, the process is applicable to other voids, such as dead-ended channels to accommodate instrumentation such as a thermocouple etc. Once the cladding process is complete and the cladding layer thereby formed, the preform may be removed to reveal the channel. Alternately, the preform may remain in the cladding layer and may define the channel within itself. The inventors have recognized that a ceramic preform immersed within an alloy melt pool may not become fully wetted, particularly if the surface of the preform contains fine structural detail. Accordingly, the preform of the present invention may be coated with a metal or metal alloy that is compatible with the superalloy material. This metal coating may improve wetting of molten superalloy material to the geometry of the preform, thereby preserving the fine detail of the preform surface in the subsequently cooled cladding layer.

Figure 1:
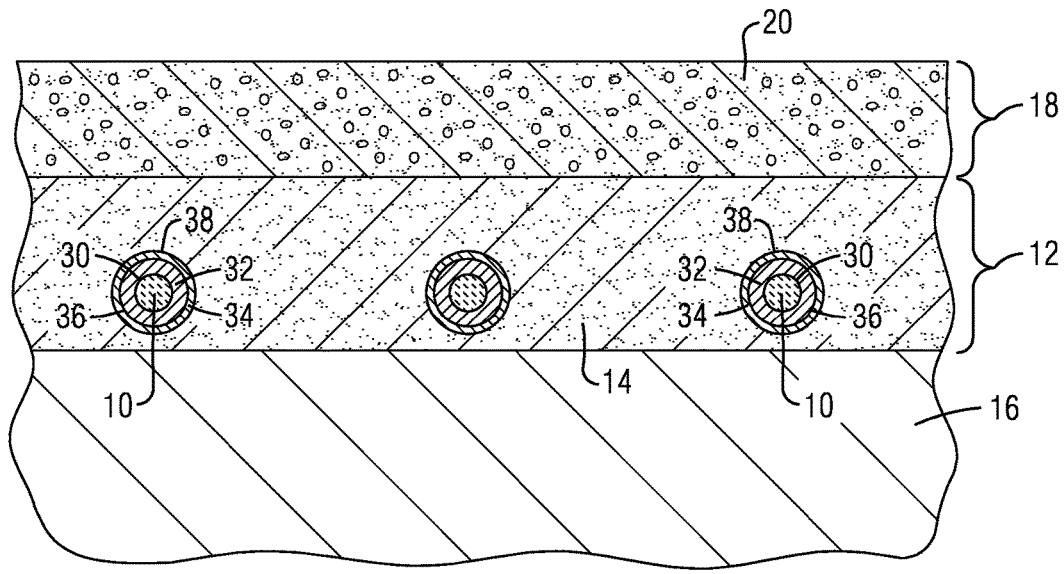
FIG. 1 schematically illustrates positioning a preform in a layer of powdered superalloy material.

FIG. 1 schematically illustrates positioning a preform 10 in a layer 12 of powdered superalloy material 14 disposed on a substrate 16 (or process bed). A layer 18 of powdered flux 20 may be placed on the layer 12 of powdered superalloy material 14. Alternately, the powdered superalloy material 14 and the powdered flux 20 may be mixed together. In another alternate exemplary embodiment, inert shielding gas or a vacuum may be used in place of (or in addition to) the powdered flux 20 to avoid atmospheric reactions during processing. The preform 10 may be made of any material that does not melt during the cladding operation. The preform 10 may be solid (e.g. a filament) or may have a shape that defines a passage there through (e.g. a tube or foam with interconnected porosity). A size and shape of the preform corresponds to the geometric detail of desired openings or voids in the final part. Example preform materials include ceramics such as alumina and zirconia. Rods (filaments) of alumina having a diameter as small as 0.28 mm in diameter are currently available. Rods (filaments) of zirconia having a diameter as small as 1.6 mm in diameter are currently available from, e.g. Ortech Advanced Ceramics of Sacramento, Calif. Both alumina and mullite ($3Al_2O_3$ $2SiO_2$) are available in tube form from, e.g. CoorsTek of Golden CO.

Optionally, an outer surface 30 of the preform 10 may be coated with a coating 32 (e.g. a metal coating) to facilitate wetting during the laser cladding operation. Suitable preform 10 materials include alumina, beryllium oxide, sapphire, zirconia, silica, magnesium oxide, boron nitride, aluminum nitride, silicon nitride, silicon carbide, aluminum silicates (including mullite), magnesium silicates, and any other suitable ceramic. Suitable coating materials include molybdenum-manganese, tungsten manganese, moly tungsten manganese, titanium, hafnium, zirconium, chromium, and niobium. Any combination of the above preform materials and coating materials may be used.

In an exemplary embodiment an alumina, beryllium oxide, or sapphire preform 10 may be coated with any of molybdenum-manganese, tungsten manganese, and moly tungsten manganese. The preform 10 may be coated using any of several known processes, including brushing, screen printing, spraying, dipping, plating, sputtering, and needle application. Typically the coating 32 may have a thickness of twenty-five microns, with a ten micron tolerance. When the coating 32 is a plating, the coating 32 may have a thickness of two to ten microns. Accordingly, in some cases plating to accomplish wetting may be applied directly to the preform 10 without an intermediate coating. Optionally, a second coating 34 may be applied a surface 36 of the coating 32 to further facilitate the wetting. The second coating 34 may include a metal or alloy compatible with the powdered superalloy material 14 which is applied during a plating process in which case the second coating 34 is a plating. For example, for a nickel based powdered superalloy material, nickel may be used for the second coating 34. Here again, the plating, and hence the second coating 34, may have a thickness of two to ten micron. An optional final step in the metallizing of the preform 10 may include a heat treatment. In an exemplary embodiment an alumina preform 10 is coated with molybdenum-manganese which is plated with nickel.

In an alternate exemplary embodiment, a zirconia preform 10 may be coated (via physical vapor deposition) with titanium (commercially available through Forschungszentrum Jülich of Jülich, Germany). Other materials suitable for coating zirconia (via physical vapor deposition) include hafnium, zirconium, chromium, and niobium.

The coating 32 and optional second coating 34 improve the wetting of the molten superalloy material to the preform during the cladding operation. The coating 32 and optional second coating 34 may or may not be consumed during the cladding operation. If consumed, the molten superalloy material will conform directly to the outer surface 30 of the preform 10. If not consumed, the molten superalloy material will conform to the outer surface 36 of the coating 32 when only the coating 32 is present, or an outer surface 38 of the second coating 34 when the second coating 34 is present. Since a shape of the outer surface 30 of the preform 10 defines a shape of the outer surface 36 of the coating 32 as well as a shape of the outer surface 38 of the second coating 34, the molten superalloy material still conforms to the shape of the outer surface 30 of the preform 10. Solidification of the molten superalloy material around the details preserves the details in the cladding layer.

If the coating 32 and/or the second coating 34 are consumed during the cladding operation, it will not have a detrimental effect on the cladding layer because the elements present in the coating 32 and the second coating 34 are preferably already found in the alloys of interest (e.g. nickel based superalloys) and the amount of material added would be so small that it would have no significant effect on the cladding layer composition or mechanical or physical properties.

Figure 2:
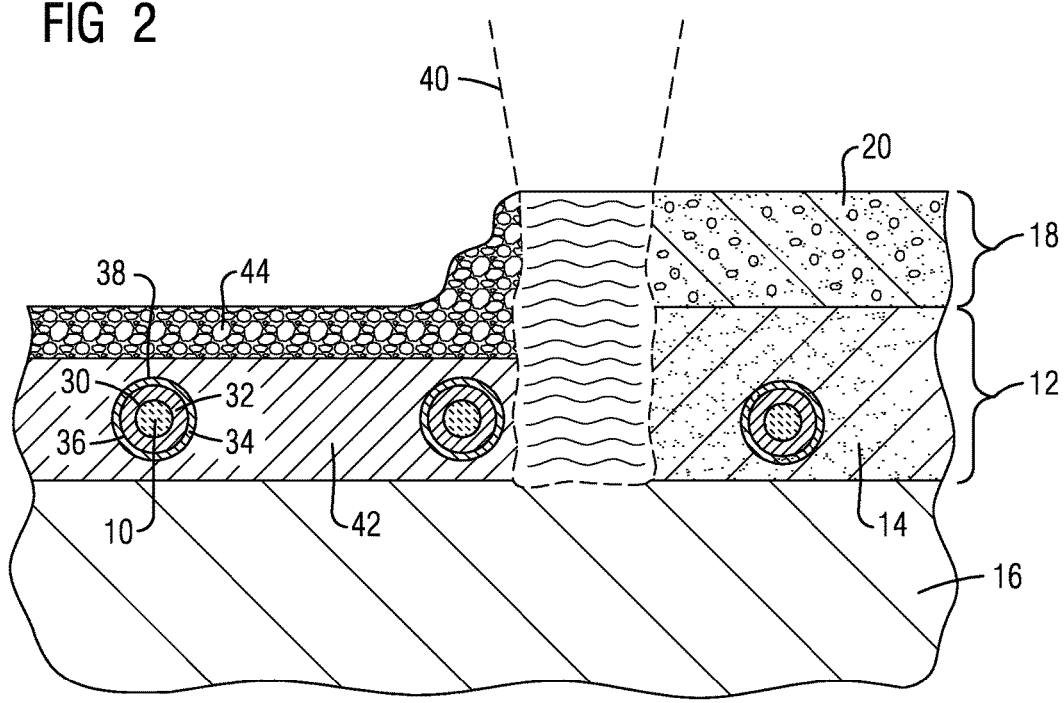
FIG. 2 schematically illustrates melting the superalloy material around the preform without melting the preform, and cooling and re-solidifying the superalloy material.

FIG. 2 schematically illustrates melting the powdered superalloy material 14 around the preform 10 without melting the preform 10. The melting may be accomplished in any manner known to those in the art. In an exemplary embodiment, a laser beam 40 selectively heats the powdered superalloy material 14 to create a melt pool of melted superalloy material. The melted superalloy material cools and solidifies to form a cladding layer 42 covered by a layer of slag 44. The preforms 10 remain intact within the cladding layer 42.

Figure 3:
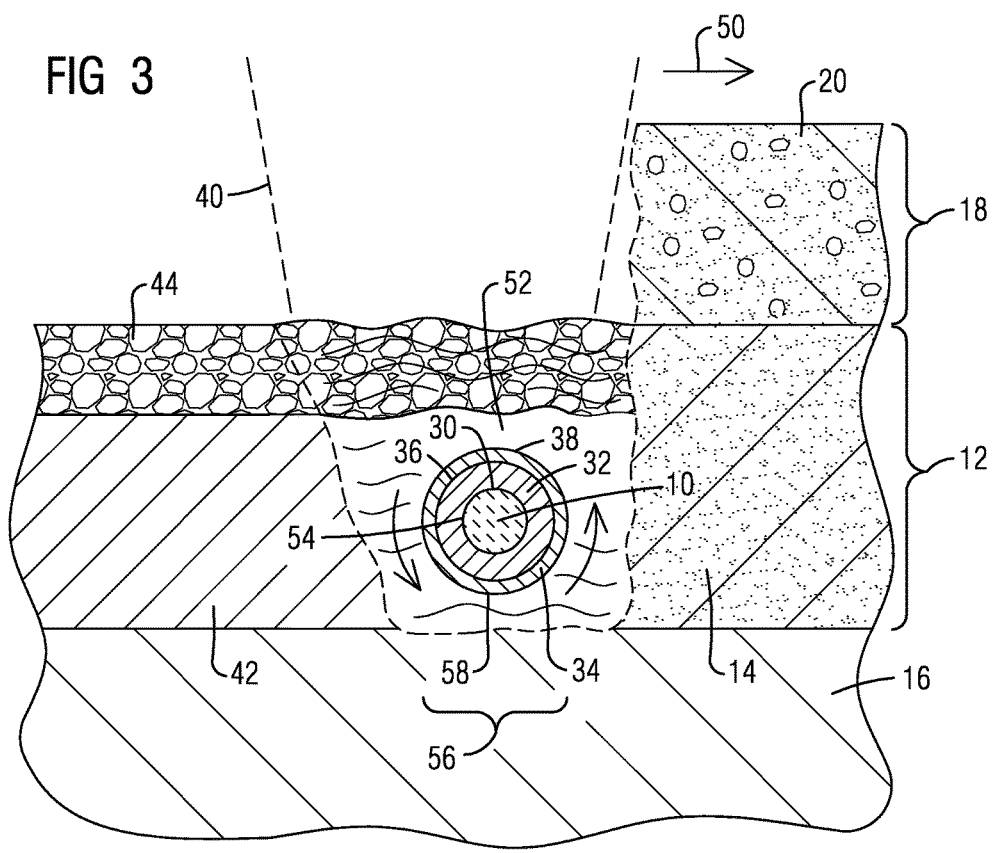
FIG. 3 is a close-up view of a deposition process.

FIG. 3 is a close-up of the melting process. As the laser beam 40 moves in a direction of travel 50 it melts the powdered superalloy material 14 and flux material 20 to form the melt pool 52 covered by slag 44. Upon reaching a preform 10, the traveling melt pool 52 surrounds the preform 10 and retains any detail present in the preform 10 as the molten superalloy material solidifies around the preform. If the coating 32 remains, once the preform 10 is removed, the cooling channel will be defined by an inner surface 54 of the coating 32. If the coating 32 is consumed, once the preform 10 is removed, the cooling channel will be defined by an inner surface of the cladding layer 42.

Conventional laser heating may position the laser beam 40 generally above the preform 10 during the heating process. Consequently, powdered superalloy material 14 in a shadowed region 56 (e.g. shadowed from direct laser impingement) under the preform 10 may not be directly heated by the laser beam 40. To ensure the powdered superalloy material 14 in the shadowed region 56 is melted and the molten superalloy material reaches an underside 58 of the preform 10, the laser beam 40 may slow its speed of travel proximate the preform 10. Increasing heat transfer into the melt pool 52 proximate the preform 10 may increase conductive heat transfer to the powdered superalloy material 14 in the shadowed region 56. High thermal conductivity preform materials such as alumina may enhance heating toward the shadowed region 56. This can promote greater heating and melting of the powdered superalloy material 14 in the shadowed region 56. Subsequent mixing of such material with a balance of the melt pool 52 will result from temperature gradient (Rayleigh-Bénard convection) as well as surface tension gradient (Marangoni convection). Agitation of the melt which promotes wetting from such convective effects may be supplemented by mechanical agitation. For example, the preform itself could be vibrated or rotated to enhance wetting. The laser beam 40 may also be angled differently as it approaches the preform 10 (e.g. proximate the preform) in a manner that permits the laser beam 40 to reach some or all of the shadowed region 56 that the laser beam 40 would not reach if an orientation of the laser beam 40 used in a balance of the laser processing were not adjusted. The improved wetting provided by the coating 32 and/or the second coating 34 will also facilitate movement of the melted material along the underside surface of the preform 10. Single or combined effects of slowed laser travel, an angled laser, a conductive preform, convective effects, surface tension effects, and mechanical agitations can enhance the molten superalloy material fully surrounding the preform 10 and conforming to the shape of the outer surface 30 of the preform 10. The single or combined effects may be employed when the laser beam 40 is proximate the preform 10 (i.e. close enough to the preform 10 to have an effect on the shadowed region 56).

Figure 4:
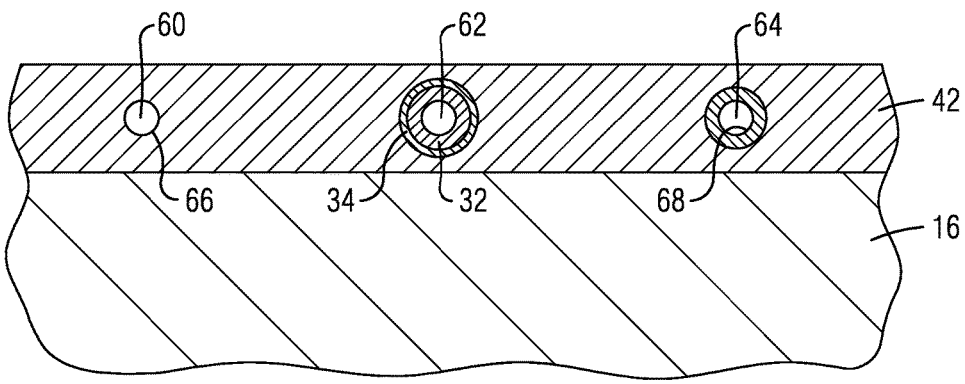
FIG. 4 schematically depicts a layer having cooling passages formed via the process illustrated in FIGS. 1-3.

FIG. 4 shows the cladding layer 42 with the layer of slag 44 removed. This cladding layer 42 may be a repair on a component, or a layer of a new component. Three cooling channels 60, 62, and 64 are visible. In an exemplary embodiment the preform 10 has been removed and a first cooling channel 60 is defined by the inner surface 66 of the cladding layer 42. This may occur when there was no coating 32 or second coating 34 on the preform 10 or it was consumed during the cladding operation. In this case the molten material conformed to the outer surface 30 of the preform 10. The preform 10 may be removed by mechanical or chemical or other means known to those in the art. For example, the preform may be cracked and shattered using ultrasonic energy and reduced to powder which is then flushed out using fluid such as pressurized air or a rinsing agent. Preforms of foam or pressed powder structure may be relatively fragile to enhance such removal. When the preform 10 comprises a hollow shape such as a tube, foam etc., the preform 10 may be cracked, shattered, and removed via thermal shock. For example, liquid nitrogen may be flushed through the perform 10, causing it to crack, during or after which it can be removed. Alternately, or in addition, when hollow the preform 10 may be cracked, shattered, and removed with mechanical shock (e.g. ultrasonic).

In an exemplary embodiment, the preform 10 has been removed and a second cooling channel 62 is defined by the inner surface 54 of the coating 32. This may occur when the preform 10 has the coating 32 and optionally the second coating 34, and the coating 32 is not consumed during the cladding operation of FIG. 3 (whether or not the second coating 34 is consumed).

In an exemplary embodiment the preform 10 remains and a third cooling channel 64 is defined by an inner surface 68 of the preform 10 which is, for example, a hollow tube or a foam. When the preform 10 is a foam that is left in place, the interconnected porosity of the foam may increase a cooling effect of the cooling channel 64. A hollow preform 10 may or may not also be coated and optionally plated.

FIG. 5 schematically depicts a component 70 having cooling passages formed by repeating the cladding process illustrated in FIGS. 1-3 during an additive manufacturing process. Each iteration of the process forms a respective cladding layer 42. The component 70 may have one cladding layer 42, several cladding layers 42, or may be composed entirely of cladding layers 42. The component may be machined between formations of cladding layers 42 and/or after all cladding layers 42 are applied. In the exemplary embodiment shown, multiple cladding layers 42 include respective cooling channels, but each cladding layer 42 need not have a respective cooling channel.

Each cladding layer 42 may have a respective type or types of cooling channels and these cooling channels may have any orientation, size, and cross sectional shape. A first cladding layer 72 includes cooling channels 60 defined by the inner surface 66 of the cladding layer 42 and oriented in one direction. A second cladding layer 74 includes cooling channels 64 defined by an inner surface 68 of the preform 10 and oriented in a different direction. A third cladding layer 76 includes a cooling channel 78 having a different and polygon shape that is oriented in yet another unique direction. A fourth cladding layer 80 has no cooling channel. Exemplary embodiments within the scope of the disclosure may connect cooling channels from one cladding layer 42 to another cladding layer 42. The connection may be provided by subsequent machining, or connecting passageways may be formed as part of the cladding operation through the use of a preform including a vertically extending leg. In this manner cooling passages could extend laterally (within a respective cladding layer 42) as well as vertically, from one cladding layer 42 to another. While connected channels for cooling have been described, channels for other purposes may be included. For example, a channel that is ended at an important location for diagnostics could be provided by a tubular preform with a coincident end. After part completion, instrumentation such as a thermocouple could be inserted through the tubular preform or into the channel formed by the preform.

FIG. 6 schematically depicts a preform 10 having details in the outer surface 30 that are replicated in the subsequently formed cooling channels. Exemplary types of such details includes a raised or recessed fin 80 (as disclosed by Kakac et al., "Heat Transfer Enhancement of Heat Exchangers"), raised or recessed trip strips 82, raised or recessed chevrons 84, and raised or recessed dimples 86 or any other feature known to those in the art disposed on the inner or the outer surface of the preform. These details may, for example, increase heat transfer to a cooling fluid in the cooling channel, and/or regulate a flow rate of the cooling fluid flowing through the cooling channel.

Geometries other than wires/filaments and tubes may be used for the preform 10. Flat plates may be used in, for example, semiconductor applications. Single and double curved plates may be used in, for example, body armor applications. Valves with precisely dimensioned holes may be formed, for example, for components that meter blood. Cups and specialized contours may be used in, for example, orthopedic implants. These non-limiting examples represent just a few of the possible applications for the process disclosed herein.

From the foregoing it can be seen that the Inventors have developed a new and innovative method for forming a material layer containing an internal void having a highly detailed internal surface geometry using a high speed cladding process with a relatively high temperature preform. This process achieved a level of detail not before possible in such a process and can be used in an additive manufacturing process to create parts faster than before possible. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
submerging a ceramic preform in a layer of powdered superalloy material, wherein the preform defines a desired shape of a void to be formed in a layer of superalloy material;
melting the powdered superalloy material around the preform without melting the preform;
cooling and re-solidifying the melted superalloy material around the preform to form the layer of superalloy material with the preform defining the shape of the void therein;
forming a melt pool during the step of heating; and
facilitating wetting of the preform by the melt pool through at least one of slowing a travel speed of a laser used to melt the powdered superalloy material proximate the preform, changing an angle of a process laser used to melt the powdered superalloy material proximate the preform, adjusting convective effects proximate the preform, adjusting surface tension effects proximate the preform, rotating the preform, and agitating the preform.

2. The method of claim 1, wherein the ceramic preform comprises a hollow ceramic tube.

3. The method of claim 2, further comprising removing the hollow ceramic tube via a mechanical or thermal shocking process.

4. The method of claim 1, further comprising removing the ceramic preform to expose a surface that defines the void.

5. The method of claim 1, further comprising coating an outer surface of the ceramic preform prior to the submerging and melting steps to facilitate wetting of the preform by the melted superalloy material.

6. The method of claim 5, wherein the outer surface of the preform is coated with at least one of the group consisting of molybdenum-manganese, titanium, tungsten manganese, moly tungsten manganese, hafnium, chromium, zirconium, and niobium.

7. The method of claim 6, further comprising plating the coating prior to the submerging and melting steps, wherein both the coating and the plating facilitate the wetting of the preform by the melted superalloy material.

8. The method of claim 7, wherein the plating comprises nickel.

9. The method of claim 1, wherein the preform comprises a raised or recessed surface feature on an exterior or interior surface, the method further comprising coating any raised or recessed surface feature on the exterior surface with a layer of material effective to facilitate wetting of the feature with the melted superalloy material during the melting step.

10. The method of claim 1 wherein the ceramic preform comprises at least one of the group consisting of alumina, zirconia, beryllium oxide, sapphire, silica, magnesium oxide, boron nitride, aluminum nitride, silicon nitride, silicon carbide, aluminum silicate and magnesium silicate.

11. The method of claim 1, wherein the preform comprises a ceramic foam.

12. The method of claim 1, further comprising coating a surface of the ceramic preform with a constituent component of the superalloy material prior to the submerging and melting steps.

13. The method of claim 1, further comprising melting the powdered superalloy material via a selective laser heating process.

* * * * *